United States Patent
Festl et al.

(10) Patent No.: US 11,225,155 B2
(45) Date of Patent: Jan. 18, 2022

(54) SWITCHING APPARATUS AND METHOD FOR SWITCHING A CURRENT

(71) Applicant: Siemens Aktiengesellschaft, Munich (DE)

(72) Inventors: Florian Festl, Regensburg (DE); Thomas Fuchs, Regensburg (DE); Andreas Neundlinger, Straubing (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 589 days.

(21) Appl. No.: 15/658,476

(22) Filed: Jul. 25, 2017

(65) Prior Publication Data
US 2018/0061598 A1 Mar. 1, 2018

(30) Foreign Application Priority Data
Aug. 30, 2016 (DE) .......................... 102016216321.3

(51) Int. Cl.
*H01H 47/22* (2006.01)
*H01F 38/28* (2006.01)
(Continued)

(52) U.S. Cl.
CPC .............. *B60L 53/14* (2019.02); *H01F 38/28* (2013.01); *H01H 9/56* (2013.01); *H01H 47/223* (2013.01); *H01H 9/563* (2013.01); *H01H 47/02* (2013.01)

(58) Field of Classification Search
CPC ....... B60L 53/14; G01R 19/155; G01R 31/02; G01R 31/026; G01R 31/3277;
(Continued)

(56) References Cited

U.S. PATENT DOCUMENTS

| 6,094,329 A | 7/2000 | Heinz et al. |
| 8,405,939 B2 * | 3/2013 | Haines ..................... H02H 9/00 361/42 |

(Continued)

FOREIGN PATENT DOCUMENTS

| CN | 103326193 A | 9/2013 |
| CN | 105161364 A | 12/2015 |

(Continued)

OTHER PUBLICATIONS

German Office Action #102016216321.3 dated Jul. 4, 2017.
(Continued)

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

A switching apparatus is disclosed for switching a current, formed using a phase conductor and a switch arranged in the phase conductor, for the purpose of switching a transmission of current via the phase conductor. In addition, the switching apparatus includes a circuit for deriving a test current from the phase conductor via a ground conductor; a sensing apparatus for detecting the test current and an evaluation apparatus for evaluating the detected test current. A control apparatus is used to control closing of the switch arranged in the phase conductor. The evaluation apparatus is configured to detect a zero crossing for an alternating current and the control apparatus is set up to prompt closing of the switch arranged in the phase conductor in accordance with the time of the zero crossing. An embodiment reduces abrasion or wear on the switch as a result of short-circuit currents during switching-on.

14 Claims, 4 Drawing Sheets

(51) Int. Cl.
*B60L 53/14* (2019.01)
*H01H 9/56* (2006.01)
*H01H 47/02* (2006.01)

(58) Field of Classification Search
CPC .. G01R 19/2509; G01R 31/327; G01R 31/50; H01F 38/28; H01H 47/02; H01H 47/223; H01H 9/56; H01H 9/563; H01H 7/16; H02H 1/0007; H02H 11/001; H02H 3/14; H02H 3/16; H02H 3/338; H02H 5/105; Y02T 10/70; Y02T 10/7072; Y02T 90/14
See application file for complete search history.

(56) References Cited

U.S. PATENT DOCUMENTS

| | | | | |
|---|---|---|---|---|
| 8,692,557 | B2 * | 4/2014 | Hein | G01R 31/50 |
| | | | | 324/505 |
| 9,437,381 | B2 | 9/2016 | Hassan-Ali et al. | |
| 2004/0174173 | A1 * | 9/2004 | Elms | G01R 31/50 |
| | | | | 324/509 |
| 2008/0123234 | A1 | 5/2008 | Koyama et al. | |
| 2011/0063768 | A1 * | 3/2011 | Sexton | H02H 3/10 |
| | | | | 361/79 |
| 2011/0216451 | A1 * | 9/2011 | Haines | B60L 3/0069 |
| | | | | 361/42 |
| 2011/0216452 | A1 * | 9/2011 | Haines | H02H 3/00 |
| | | | | 361/42 |
| 2014/0254050 | A1 * | 9/2014 | Haines | H02H 3/162 |
| | | | | 361/42 |
| 2014/0268473 | A1 * | 9/2014 | Hassan-Ali | H01H 47/10 |
| | | | | 361/179 |
| 2015/0355273 | A1 * | 12/2015 | Adlhoch, Jr. | G01R 31/3277 |
| | | | | 324/750.3 |
| 2016/0370418 | A1 * | 12/2016 | Pollet | G01R 31/50 |

FOREIGN PATENT DOCUMENTS

| | | | | |
|---|---|---|---|---|
| DE | 19601880 | A1 | 7/1997 | |
| DE | 102007054860 | A1 | 6/2008 | |
| DE | 202012012590 | U1 * | 8/2013 | ........... G01R 19/155 |
| DE | 202012012590 | U1 | 8/2013 | |
| DE | 112014001345 | T5 | 11/2015 | |
| EP | 0806825 | A2 | 11/1997 | |
| JP | 2008263744 | A | 10/2008 | |
| WO | WO 2015128493 | A1 | 9/2015 | |

OTHER PUBLICATIONS

Chinese Office Action dated Sep. 4, 2016.
Office Action for Chinese Patent Application No. 201710748878.7 dated Jul. 30, 2020 and English translation thereof.
Zhang Guancheng: "Theory Basis of Electrical Appliances": (the revised edition), edited by, China Machine Press, Oct. 1989, pp. 96, 115 (with statement of relevance attached).
Office Action for Chinese Patent Application No. 201710748878.7 dated Jun. 1, 2021 and English translation thereof.

* cited by examiner

SWITCHING APPARATUS AND METHOD FOR SWITCHING A CURRENT

PRIORITY STATEMENT

The present application hereby claims priority under 35 U.S.C. § 119 to German patent application number DE 102016216321.3 filed Aug. 30, 2016, the entire contents of which are hereby incorporated herein by reference.

FIELD

At least one embodiment of the application generally relates to an apparatus and a method for switching a current.

BACKGROUND

Devices having switching contacts, such as e.g. contactors or relays, may be exposed to high short-circuit currents that can place a severe load on the switching contacts. In the worst case, these short-circuit currents can lead to contact welding, i.e. to damage in the devices.

At present, contacts are therefore appropriately dimensioned in order to withstand defined short-circuit currents for a determined life or number of switching operations. This dimensioning increases both the size of the overall device and the costs, since special materials and a greater material thickness need to be used for the contacts in order to prevent welding of the contacts.

SUMMARY

At least one embodiment of the invention improves the protection for the switching apparatuses as regards defects brought about by short-circuit currents.

At least one embodiment is directed to a switching apparatus for switching a current and at least one embodiment is directed to a method for switching a current using a switching apparatus.

According to at least one embodiment of the invention is directed to a switching apparatus for switching a current that is, by way of example, part of a charging apparatus for electric vehicles. This switching apparatus comprises one or more (frequently three) phase conductors and for the most part also a neutral conductor.

For the sake of simplicity, at least one embodiment of the invention is described below for a configuration with one phase conductor; solutions with a plurality of phase conductors are equally the subject matter of the claimed invention, however.

According to at least one embodiment of the invention, the phase conductor of the switching apparatus has had a switch (e.g. relay, contactor) introduced or looped into it that is used for switching a transmission of current via the phase conductor. In addition, a (perhaps connectably configured) circuit for deriving a test current from the phase conductor via a ground conductor is provided. In this case, the amperage or amplitude of the test current is preferably low in comparison with the amperage or amplitude of the current switched by the switching apparatus (e.g. a value of between 1 and 2 mA for the amplitude of the test current would be a suitable choice).

At least one embodiment of the invention also relates to a method for switching a current using a switching apparatus according to at least one embodiment of the invention. The method involves a test current being sensed, the sensed test current being evaluated and, in this case, a zero crossing being detected for an alternating current and closing of a switch arranged in a phase conductor being prompted in accordance with the time of the zero crossing.

BRIEF DESCRIPTION OF THE DRAWINGS

The invention is described in more detail below within the context of example embodiments with reference to figures, in which.

DETAILED DESCRIPTION OF THE EXAMPLE EMBODIMENTS

Figure 1:
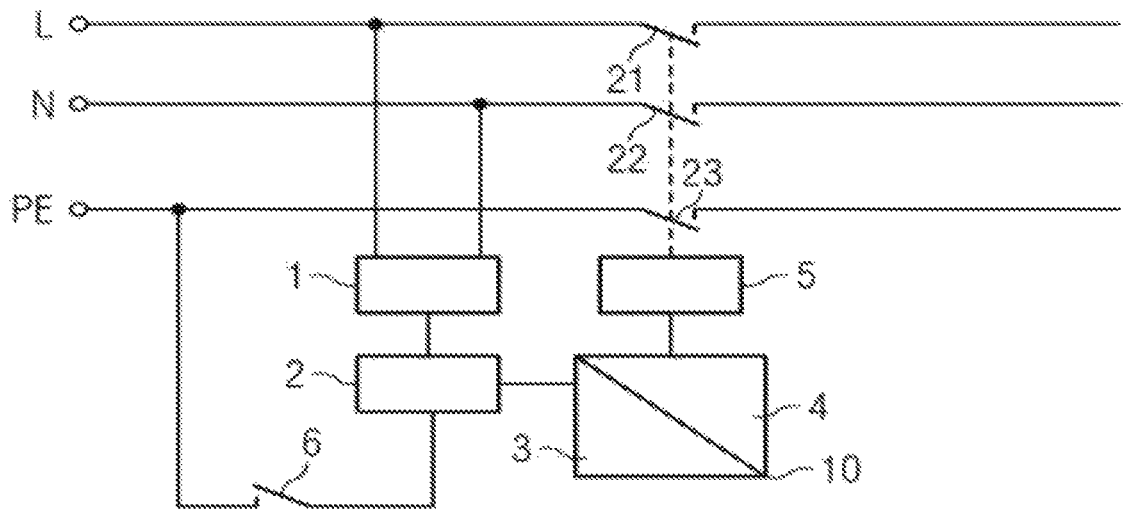
FIG. 1: shows the basic design of a switching apparatus according to an embodiment of the invention.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the invention, the phase conductor of the switching apparatus has had a switch (e.g. relay, contactor) introduced or looped into it that is used for switching a transmission of current via the phase conductor. In addition, a (perhaps connectably configured) circuit for deriving a test current from the phase conductor via a ground conductor is provided. In this case, the amperage or amplitude of the test current is preferably low in comparison with the amperage or amplitude of the current switched by the switching apparatus (e.g. a value of between 1 and 2 mA for the amplitude of the test current would be a suitable choice).

The switching apparatus of at least one embodiment comprises a sensing apparatus (which is formed e.g. with an optocoupler or a current transformer; in the latter case, perhaps also as part of a summation current transformer for a ground-fault circuit interrupter) for detecting the test current. Further elements are an evaluation apparatus for evaluating the detected test current and a control apparatus for controlling the opening and closing of the switch arranged in the phase conductor. In this case, evaluation, control and if need be monitoring may be implemented in the same module or the same unit, e.g. the functions of the evaluation apparatus and of the control apparatus can be provided in a microcontroller.

According to at least one embodiment of the invention, the evaluation apparatus is configured to detect a zero crossing for an alternating current. The control apparatus is set up to prompt closing of the switch arranged in the phase conductor in accordance with the time of the zero crossing. In addition, a switch that is perhaps arranged in the ground conductor can be closed in parallel. According to one configuration, there may be provision for further phase conductors, a ground conductor and a neutral conductor to be closed simultaneously by way of switching.

The switching during zero crossing lowers the load on the switch in the event of a short circuit. The likelihood of a defect is therefore distinctly reduced.

Preferably, the circuit, the sensing apparatus and the evaluation apparatus are parts of a device for identifying a protective conductor state (e.g. the continuity of the ground line).

According to one configuration, the switching apparatus comprises a neutral conductor and the circuit is connected to the neutral conductor for the purpose of deriving the test current by way of the phase conductor and the neutral conductor.

According to one development, the evaluation apparatus is configured to ascertain the period for an alternating current and to compute a zero crossing in advance. In addition, the control apparatus is configured to prompt closing of the switch arranged in the phase conductor in accordance with the time of a zero crossing computed in advance.

At least one embodiment of the invention also relates to a method for switching a current using a switching apparatus according to at least one embodiment of the invention. The method involves a test current being sensed, the sensed test current being evaluated and, in this case, a zero crossing being detected for an alternating current and closing of a switch arranged in a phase conductor being prompted in accordance with the time of the zero crossing.

FIG. 1 shows a basic design for a switching apparatus according to the invention. The figure shows a phase conductor L, a neutral conductor N and a ground conductor PE that are able to be connected via switches 21, 22 and 23, respectively, for the purpose of supplying energy or power. Closing of the switches 21-23 can prompt short-circuit currents to arise that can lead to damage in the switches (typically welding of the switches). A circuit 1 is provided that is used to take or derive a test current from the phase conductor L and the neutral conductor N. In this case, it would be conceivable for the current to be derived solely from the phase conductor L; the use of both conductors L and N has the advantage that it is also possible to use plugs in which L and N are not firmly prescribed (Nema 1-15, CEE 7/16 Europlug, CEE 7/4 grounding-type plug). The test current derived by the circuit 1 is sensed by a sensing apparatus or detection apparatus 2 and forwarded to an evaluation apparatus 3. This evaluation apparatus 3 is typically part of a computation unit 10 provided for control and monitoring tasks, e.g. a microcontroller. In the present case, the computation unit 10 also has an integrated control function or control apparatus 4 that provides control commands for a circuit 5 for opening and closing the switches 21 to 23. The test current flows via the ground conductor PE. In this case, a switch 6 may optionally be provided that closes the test current circuit. This switch 6 may also be controlled by the computation unit 10 (not depicted in the figure). In this case, it is assumed that the conductors are used to transmit an alternating current. This current is essentially sinusoidal and accordingly, depending on the line frequency, passes through a point at which the voltage is equal to zero. The test current and hence this zero crossing are sensed by way of the detection or identification apparatus 2, and a signal that corresponds to the detected amperage is forwarded to the evaluation unit 3.

When the switching contacts are intended to be connected, the detected voltage is evaluated by the evaluation unit 3 for a zero crossing. If a zero crossing is identified, the control device 4 sends a signal to the circuit 5, which causes closing of the switches 21 to 23. Hence, the switching contacts can be controlled such that they switch at the time of a voltage zero crossing or shortly afterwards or before. A short circuit that occurs would likewise be kept at almost zero on account of the low voltage during the switching process (switching process at zero crossing). This takes care of the switching contacts and prevents contact welding defects. If the delay as a result of the detection of the zero crossing and the signaling for the closing of the switches is significant, which means that the amperage noticeably differs from zero at the actual switching time, then evaluation of the test signal allows the time of a future zero crossing to be computed in advance by the computation unit 10, and switching to be performed accordingly.

Figure 2:
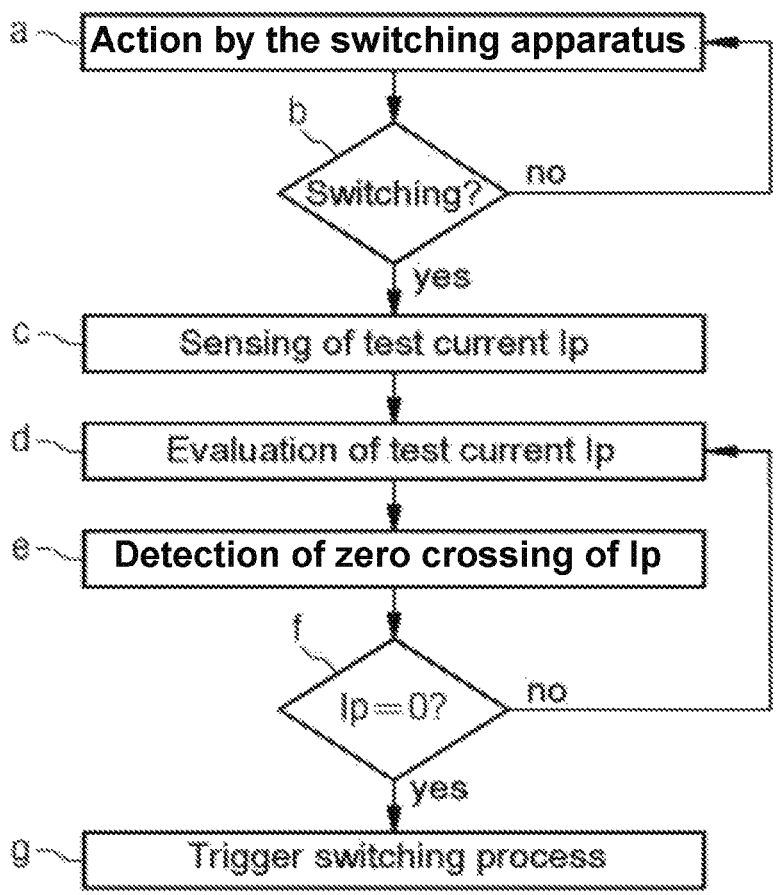
FIG. 2: shows the basic flow of a method according to an embodiment of the invention.

FIG. 2 schematically shows a method according to the invention. A switching apparatus stands by for action or connection of a current (step a). If switching is now required (step b), then a process of the switching time being stipulated in accordance with the invention is performed. To this end, the test current Ip is sensed, if need be following connection of the test circuit by a switch provided for this purpose (switch 6 in FIG. 1, which is also controlled by the computation apparatus 10 if need be in that case). This test current Ip is then evaluated in step d and, in the process, examined for a zero crossing (step e). If a zero crossing is now detected in step f, then finally the switching process or the connection of the current is triggered in step g.

Preferably, at least one embodiment of the invention involves a circuit being used that is already provided for monitoring the continuity of an existing ground line, the ground line being monitored by virtue of the phase line applying a test current to the ground line. The use of a ground conductor monitoring system that already exists, as is required for some electrical devices, such as a charging cable for electric vehicles, for example, can thus be used to switch switchgear with controlled energy.

Figure 3:
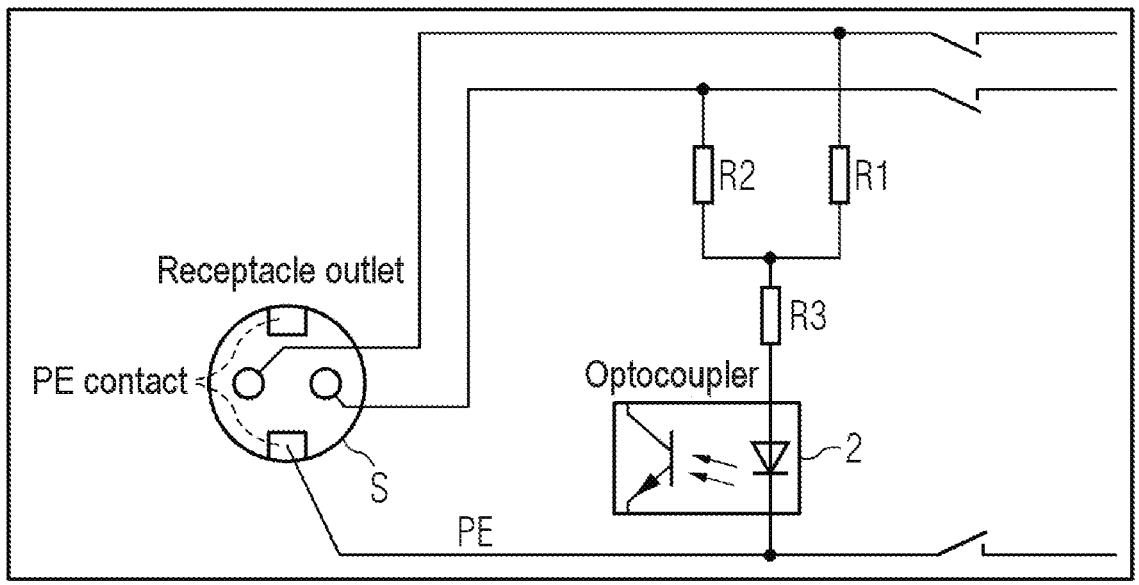
FIG. 3: shows a configuration of a ground line monitoring system that can be used for an embodiment of the invention.
Figure 4:
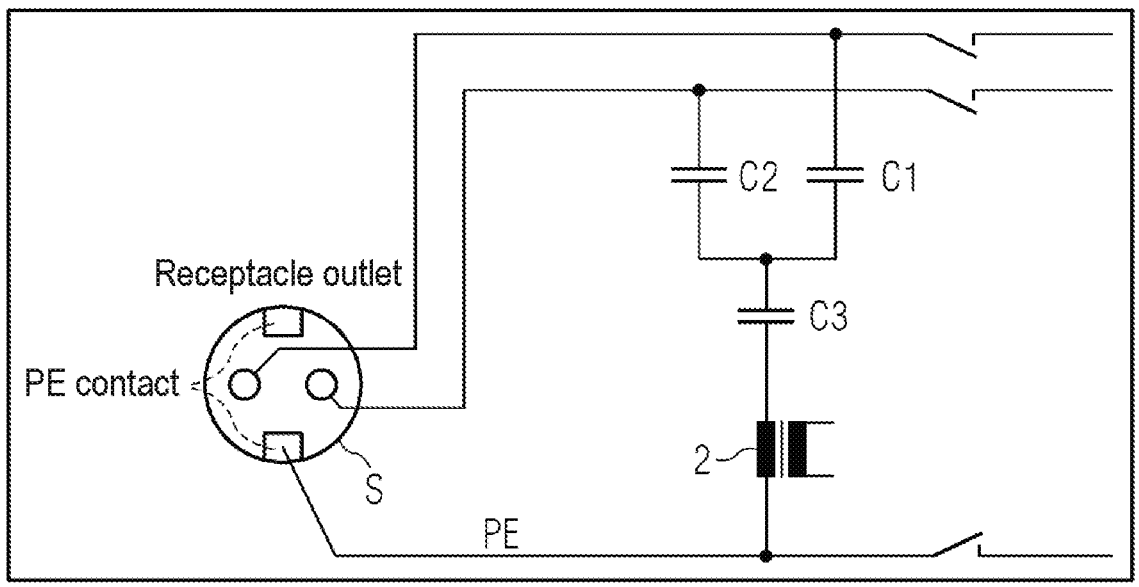
FIG. 4: shows an alternative basic configuration of a ground line monitoring system.
Figure 5:
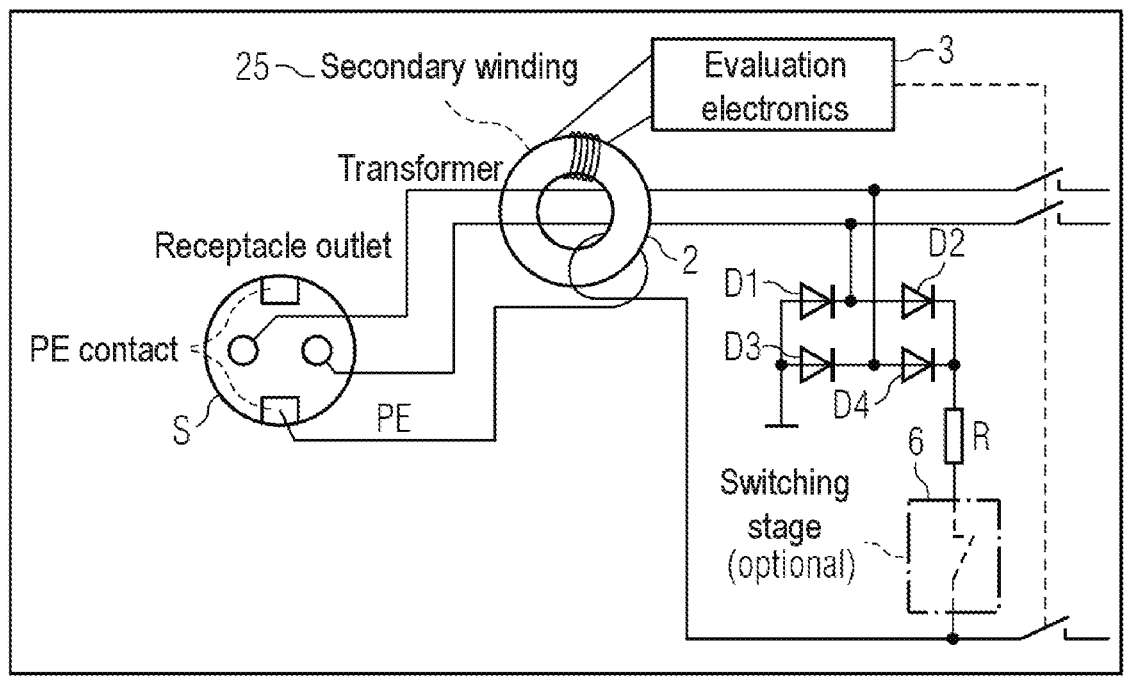
FIG. 5: shows a further basic configuration of a ground line monitoring system.

Schematic depictions of a ground conductor monitoring system that can be used for the subject matter of the invention are depicted in FIGS. 3 to 5. Further circuits that can be developed to produce a switching apparatus according to at least one embodiment of the invention and are used for monitoring or identifying a protective conductor state are described in the documents DE 20 2012 012 590 U1, EP 0806825 A2 and DE 196 01 880 A1, the entire contents of each of which are hereby incorporated herein by reference.

FIG. 3 schematically shows a ground conductor monitoring system. Again, three conductors, a phase conductor P, a neutral conductor N and a ground conductor PE, are shown that are connected to the power grid via a receptacle outlet S. A circuit that comprise the resistors R1, R2 and R3 is used to derive a current from the phase conductor P and the neutral conductor N, which current is detected by way of a current sensor 2, which is formed using an optocoupler.

FIG. 4 indicates a further circuit, in the case of which the circuit for tapping a test current is formed using capacitors C1, C2 and C3. In this case, the current sensor is implemented using a transformer 2. In the case of this second variant, it is also possible for the transformer to be part of a summation current transformer, which is frequently already provided within the context of current-operated ground-fault circuit interrupter systems. FIG. 5 shows a summation current transformer 2 that is connected to evaluation electronics 3 via secondary windings 25. If a test current now flows in the ground conductor PE introduced into the transformer 2 by way of a loop, said test current is detected and is forwarded to the evaluation unit 3 by way of the secondary windings 25. The circuit for tapping energy is in this case formed by way of four diodes D1, D2, D3, D4 and a resistor R.

Figure 6:
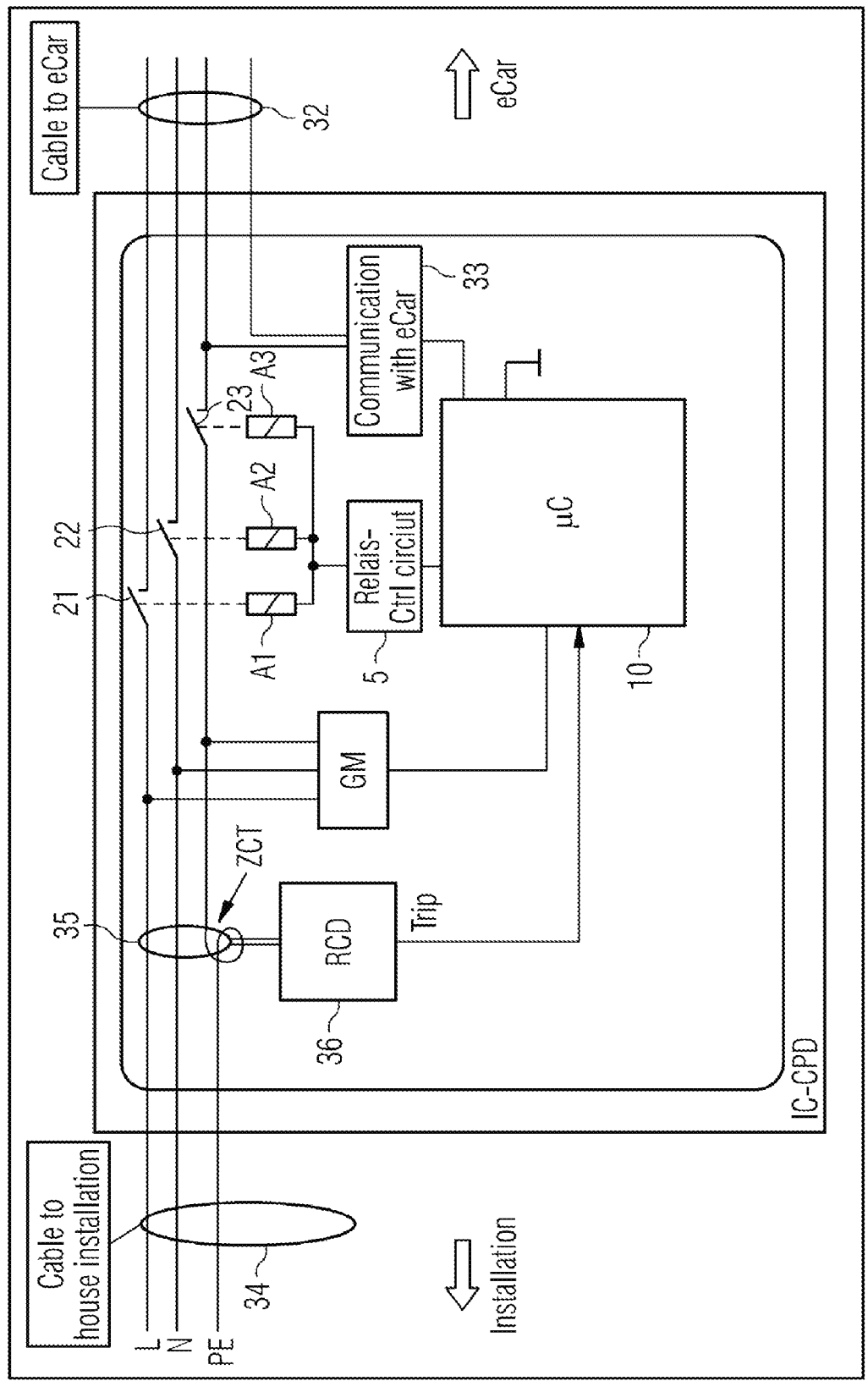
FIG. 6: shows a protection and monitoring unit of a charging cable with a switching apparatus according to an embodiment of the invention.

One area of application is the integration of a circuit according to the invention into a control and protection unit, as is used as part of a charging cable. This is shown in FIG. 6. The figure depicts such a unit, which is also referred to as an "In-cable Control and Protecting Device" (IC-CPD). The unit has a phase conductor L, a neutral conductor N and a ground conductor PE routed through it. One end 34 of these is connected to a house-based installation for supplying power or to the power grid of a house. At the other end, the charging cable is used to make a connection 32 to an at least partly electrically operated automobile or vehicle. The unit for control and protection has a microcontroller 10 as central computation component. To protect against fault currents, a summation current transformer 35 is used that is used to actuate an RCD 36. A circuit is provided that is used both for ground conductor detection and for control of the switching time in accordance with the invention. This circuit is denoted by the reference symbols 1 and 2. Likewise, a circuit 5 controlled by the microcontroller 10 for closing and opening the relays 21, 22 and 23 is depicted. In this case, the relays 21, 22 and 23 are moved into the different states (open and closed) by way of electromechanical drives A1, A2 and A3. Likewise depicted is a module 33 for communication with the electric vehicle. The approach according to the invention distinctly reduces the load on the relays 21 to 23 during switching-on in this case, because even short circuits during a zero crossing in the alternating current are accordingly minor. That is to say that, for a short-circuit current that occurs, the low voltage during a zero crossing in a switching process means that the energy is likewise reduced to almost zero. This takes care of the switching contacts, and contact welding can be prevented without expensive contact materials. In the example embodiment, a microcontroller is used in order to control the time of a switching process accordingly within the context of an existing ground conductor monitoring signal. The evaluation unit required can also be implemented other than by way of a microcontroller, however. This likewise applies to the function of actuating the switching contacts by way of a simple further signal in the voltage zero crossing.

At least one embodiment of the invention has been described in more detail above for a charging cable. It can be employed very much more broadly, however. Similarly, the specific configuration for the conductors can differ from the situation shown in the example embodiment, it particularly also being possible for a plurality of phase conductors to be prescribed from which test currents are then derived together or individually.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A switching apparatus for switching a current, comprising:
   a phase conductor;
   a switch, connected to the phase conductor, to switch a transmission of current via the phase conductor;
   a circuit to derive an alternating test current from the phase conductor via a ground conductor;
   a sensing apparatus to detect the alternating test current;
   an evaluation apparatus to evaluate the detected alternating test current; and
   a control apparatus, connected to the phase conductor, to control opening and closing of the switch, wherein the evaluation apparatus is configured to detect a zero crossing for the alternating test current, and wherein the control apparatus is configured to prompt closing of the switch in accordance with a time of the zero crossing, and wherein the circuit, the sensing apparatus and the evaluation apparatus are configured to identify continuity of the ground conductor, wherein an amperage of the alternating test current is relatively low in comparison with an amperage of the current switched by the switching apparatus.

2. The switching apparatus as claimed in claim 1, further comprising:
another switch, connected to the ground conductor, wherein the control apparatus is configured to prompt closing of the another switch in accordance with the time of the zero crossing.

3. The switching apparatus of claim 1, further comprising:
a neutral conductor, the circuit being connected to the neutral conductor to derive the test current by way of the phase conductor and the neutral conductor.

4. The switching apparatus of claim 1, wherein the sensing apparatus is formed using an optocoupler or a current transformer.

5. The switching apparatus of claim 1, wherein the evaluation apparatus is implemented using a microcontroller.

6. The switching apparatus of claim 1, wherein the control apparatus is implemented using a microcontroller.

7. The switching apparatus of claim 1, wherein the evaluation apparatus is configured to ascertain a period for the alternating test current and is configured to compute a zero crossing in advance, and wherein the control apparatus is configured to prompt closing of the switch in accordance with the time of a zero crossing computed in advance.

8. The switching apparatus of claim 1, wherein the switching apparatus is part of a charging cable.

9. The switching apparatus of claim 2, wherein the circuit, the sensing apparatus and the evaluation apparatus are parts of a device for identifying a protective conductor state.

10. The switching apparatus of claim 2, further comprising:
a neutral conductor, the circuit being connected to the neutral conductor to derive the test current by way of the phase conductor and the neutral conductor.

11. The switching apparatus of claim 5, wherein the control apparatus is further implemented using the microcontroller.

12. A charging cable comprising:
the switching apparatus of claim 1.

13. A charging cable comprising:
the switching apparatus of claim 2.

14. A method for switching a current using a switching apparatus, the method comprising:
sensing an alternating test current;
evaluating the sensed alternating test current;
detecting a zero crossing for the alternating test current;
identifying continuity of a ground conductor; and
prompting a closing of a switch, connected to a phase conductor of the switching apparatus, in accordance with a time of the zero crossing wherein an amperage of the alternating test current is relatively low in comparison with an amperage of the current switched by the switching apparatus.

* * * * *